UNITED STATES PATENT OFFICE.

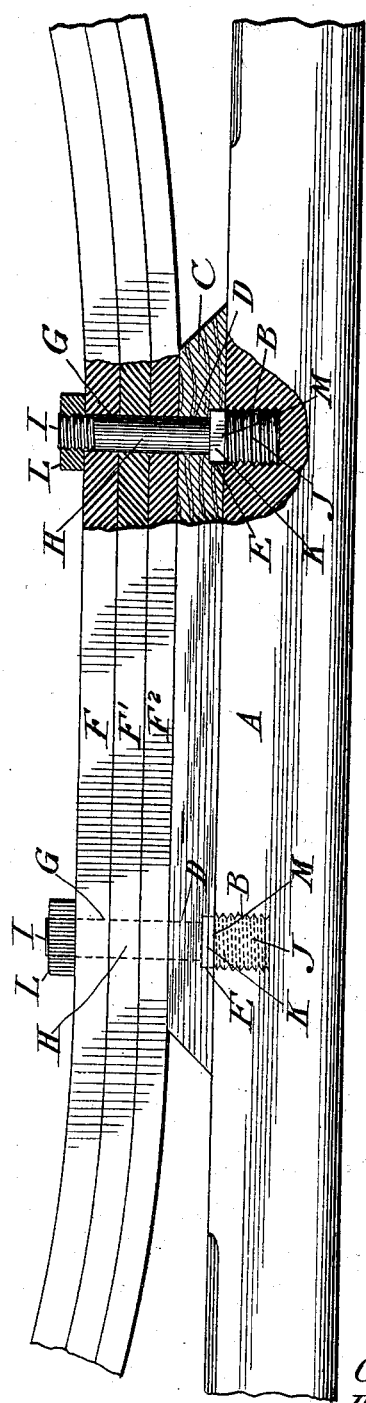

OSGOOD MORRILL AND HARLAN P. WELLS, OF AMESBURY, MASSACHUSETTS.

MEANS FOR UNITING PARTS OF VEHICLES.

SPECIFICATION forming part of Letters Patent No. 628,891, dated July 11, 1899.

Application filed February 27, 1899. Serial No. 707,095. (No model.)

*To all whom it may concern:*

Be it known that we, OSGOOD MORRILL and HARLAN P. WELLS, citizens of the United States, residing at Amesbury, in the county of Essex and State of Massachusetts, have invented certain new and useful Improvements in Means for Uniting Parts of Vehicles, of which the following is a specification.

The object of our invention is the provision of means for uniting parts of a vehicle, which means shall be of light weight, simple in construction, cheap in first cost, and easily applied, which when applied shall be for the most part out of sight, which shall not excessively weaken the elements of parts, which shall have the greatest thickness of metal located at the point or points subjected to the greatest strains or stresses, and which, finally, shall be adapted to hold the parts firmly in their relative positions.

With the above objects in view our invention consists, first, in a bolt threaded at the ends and of different diameters where the threads are located, the part of the bolt adjacent the larger diameter being angular in cross-section.

Further, it consists in the combination, with a bolt such as specified, of an axle and spring, the said axle being tapped to receive the part of the bolt which is of the larger diameter.

Finally, it consists in certain novelties of construction and combinations of parts hereinafter set forth and claimed.

The accompanying drawing illustrates one example of the physical embodiment of the invention in connection with an axle, spring, and filling piece or block of a vehicle.

The single view shows an axle and the leaves of a spring broken away at the ends, a filling piece or block of full length, and the parts united by two bolts of novel construction. The location of the bolt at the left is indicated by dotted lines and the one at the right in full lines, the spring, block, and axle being broken away adjacent the bolt.

Referring to the figure, the letter A designates an axle of any well-known type or form.

B B are two tapped or threaded holes extending some distance into but not through the axle.

C is a filling piece or block made of any suitable material.

D D are holes extending through the block; E E, angular recesses, preferably square, made in the block and concentric with the holes therethrough; F F' F$^2$, leaves of a spring; G G, holes through the leaves; H H, bolts; I I, the threaded ends of the bolts having the small diameters of about five-sixteenths of an inch, more or less; J J, the threaded ends of the bolts having the larger diameters of about seven-sixteenths of an inch, more or less; K K, angular parts of the bolts, preferably square, of the same dimensions as the recesses E E in the block, and L L are nuts.

To assemble the several elements or parts, the larger threaded ends J J of bolts H H are screwed into the holes B B by means of a wrench applied to the angular portions K K, the said angular portions projecting above the top surface of the axle when the bolts are seated. Next the block C is adjusted on the bolts, so that the angular portions K K of the latter will closely fit within the recesses E E of the block. Then the leaves of the spring are passed over the smaller ends of the bolts, and finally nuts are applied to the projecting ends of the bolts and screwed down.

From the foregoing it will be seen that we have provided means for uniting parts of a vehicle which fulfil all the conditions set forth as the object of our invention. It is obvious that the greatest strains and stresses in service will be at the points M M (which constitute the fulcrums when the bolts are considered as levers) and where the diameters are sufficient to withstand such strains. By forming the recesses E E in the block, within which the angular parts K K are closely seated, the bolts cannot turn, and consequently all the combined parts or elements are firmly held united in their proper relative positions.

While we have illustrated and described only one example of the physical embodiment of our invention and that in connection with an axle and spring, we do not thereby intend to limit the same to such embodiment, inasmuch as it may be applied in other modes and in other combinations and for uniting other parts of a vehicle. Moreover, the filling piece or block may in some cases be discarded and minor modifications made in the bolt or bolts, such as a change in shape and proportions and the omission of the angular portion or portions, without constituting a substantial departure.

What we claim is—

1. The combination, in a vehicle, and with the several parts or elements to be united, of a bolt, H, having an angular portion K, a threaded end, I, and a threaded end, J, of larger diameter than the end, I; the end, J, being screwed into a hole extending part way through one of the elements and one of said elements having a recess E to receive the angular portion K of the bolt; in substance as and for the purpose set forth.

2. The combination with an axle having two tapped holes, B B, of bolts provided with enlarged threaded ends, J J; a spring; and means for holding the spring and axle firmly in their relative positions; in substance as set forth.

3. The combination with an axle having tapped holes, B B, of bolts provided with enlarged threaded ends, J J; a filling piece or block; a spring; and means for clamping the several elements together; in substance as set forth.

4. The combination with an axle having the tapped holes, B B, of bolts provided with threaded and angular parts or portions, K K; a block having recesses, E E; a spring; and means for clamping the parts together; in substance as set forth.

5. The combination with an axle having the tapped holes, B B, of bolts provided with enlarged threaded ends, J J, and threaded ends, I I; a spring; and nuts; in substance as set forth.

In testimony whereof we affix our signatures in presence of two witnesses.

OSGOOD MORRILL.
HARLAN P. WELLS.

Witnesses:
GEORGE H. BRIGGS,
DELL W. DOLLIER.